United States Patent
Sasaki et al.

(10) Patent No.: US 6,490,265 B1
(45) Date of Patent: Dec. 3, 2002

(54) CDMA RECEIVER PHASE TRACKING SYSTEM

(75) Inventors: Makoto Sasaki, Kanagawa (JP); Takayuki Nakano, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/216,244

(22) Filed: Dec. 18, 1998

(30) Foreign Application Priority Data

Dec. 22, 1997 (JP) .............................. 9-364765

(51) Int. Cl.[7] .............................................. H04B 7/216
(52) U.S. Cl. ...................... 370/342; 370/441; 370/479; 370/491; 370/516; 375/147
(58) Field of Search ................................ 370/215, 278, 370/311, 335, 342, 464, 441, 479, 491, 516, 316; 375/141, 142, 145, 147, 149, 150, 322, 323, 130, 136, 137, 316, 362; 455/452

(56) References Cited

U.S. PATENT DOCUMENTS

| | | | | |
|---|---|---|---|---|
| 5,457,813 A | * | 10/1995 | Poutanen | ..................... 375/345 |
| 5,577,022 A | * | 11/1996 | Padovani et al. | ........... 370/332 |
| 5,577,025 A | | 11/1996 | Skinner et al. | |
| 5,881,047 A | * | 3/1999 | Bremer et al. | .............. 370/207 |
| 5,930,244 A | * | 7/1999 | Ariyoshi et al. | ............ 370/335 |
| 5,943,606 A | * | 8/1999 | Kremm et al. | .............. 342/358 |
| 6,047,016 A | * | 4/2000 | Ramberg et al. | ............ 375/148 |
| 6,081,547 A | * | 6/2000 | Miya | .......................... 370/342 |

* cited by examiner

Primary Examiner—Hassan Kizou
Assistant Examiner—David Odland
(74) Attorney, Agent, or Firm—Pearne & Gordon LLP

(57) ABSTRACT

Despreading means 10 despreads a pilot signal included in a first received signal 1. Strength determination means 15 determines the strength of the despread pilot signal. Integration control means 16 determines the integration interval used by integration means 13, from the strength of the received pilot signal. The differences in strength detected by strength difference detection means 12 are added together by the integration means 13 over the period of time decided by the integration control means 16. The integration interval used by the integration means 13 is made changeable according to the receiving environment. Accordingly, when there is the superior receiving environment, there is reduced the load imposed on the integration means 13 when the integration means 13 performs the processing operations. Therefore, there can be realized a superior CDMA receiver phase tracking system which dissipates a fewer amount of electric power.

9 Claims, 2 Drawing Sheets

CDMA RECEIVER PHASE TRACKING SYSTEM

BACKGROUND OF THE INVENTION

The present invention relates to a CDMA receiver phase tracking system, and more particularly, to a CDMA receiver phase tracking system which optimally changes the amount of processing operations for calculation of phase tracking according to the receiving environment, as well as to a CDMA receiver.

In code division multiple access (CDMA) spectrum spread digital communication, a pilot signal plays an important role in ensuring and maintaining synchronization between a base station and a mobile station. A CDMA receiver phase tracking system is used for ensuring synchronization with the pilot signal.

FIG. 4 shows the configuration of a conventional CDMA receiver phase tracking system. A signal 1 which is received by the CDMA receiver and converted into a signal of base band range through frequency conversion is input to despreading means 10, where the signal is despread. In short, voltage-controlled oscillation means 10a provided in the despreading means 10 produces a despread code. A despreading device 10b despreads a pilot signal contained in the received signal through use of the thus-produced despread code. Phase shift means 10c produces from the despread code a despread advance code whose timing is made faster by a given period of time and a despread lag code whose timing is made later by a given period of time. A changeover switch 10d permits alternate output of the despread advance code and the despread lag code. The despread timing signal is made earlier by a given period of time through use of the despread advance code, and the pilot signal included in the received signal is despread by the despreading device 10e. Further, despread timing is made later by a given period of time through use of the despread lag code, and the pilot signal included in the received signal is despread.

Strength determination means 11 determines the strength of the pilot signal despread by making the despread timing earlier by a given period of time or the strength of the pilot signal despread by making the despread timing later by a given period of time.

A strength difference detection section 12a provided in strength difference detection means 12 detects a difference between the strength of the pilot signal despread by making the despread timing earlier (or later) by a given period of time and the strength of the pilot signal despread by making the despread timing later (or earlier) by a given period of time, the strength of the latter pilot signal having been received from the strength determination means 11 and stored in a storage section 12 prior to determination of the strength of the former pilot signal. More specifically, a difference is detected by subtracting the strength of the pilot signal despread by making the despread timing later by a given period of time from the strength of the pilot signal despread by making the despread timing earlier by a given period of time.

Integral means 13A integrates a difference-between the pilot signal despread by making the despread timing by earlier a given period of time and the pilot signal despread by making the despread timing later by a given period of time-corresponding to the overall received data frame. On the basis of the result of integration, phase tracking control means 14 controls the despread timing of the despreading means 10.

However, in the foregoing existing CDMA receiver phase tracking system, the integration means 13 integrated the strength difference corresponding to the entire received data frame. It has already been known that an integration interval can be reduced in superior receiving conditions; namely, even if the strength difference corresponding to the entire received data frame is not integrated, there is obtained an accuracy of phase tracking which is identical with that obtained by integrating all the difference corresponding to the entire received data frame. However, the strength difference corresponding to the entire received data frame is integrated every interval on the basis of the assumption that the receiving environments will be deteriorated. For this reason, the tracking system has a problem of the integration means 13 performing excessive processing operations.

SUMMARY OF THE INVENTION

The present invention is aimed at solving the aforementioned problem in the existing system, and the object of the present invention is to provide a superior CDMA receiver phase tracking system in which there can be changed the interval at which the integration means 13 performs an integration operation according to receiving environments and which reduces the load imposed on the integration means by decreasing the amount of processing operations in a superior receiving environment, thus realizing low power consumption.

To solve the problem, the present invention provides a CDMA receiver phase tracking system having the following configuration. Specifically, despreading means despreads a pilot signal included in a received signal, and strength determination means determines the strength of the despread pilot signal. Integration control means decides an integration interval from the strength of the received pilot signal and by means of an ON/OFF switch activates or deactivates the integration means according to the integration time. Strength difference detection means detects differences in strength among received pilot signals having different phases, and the integration means adds together the strength differences, thus producing a received strength difference sum. Phase tracking control means adjusts a despread phase on the basis of the received strength difference sum.

With the foregoing configuration, the integration interval used by the integration means is made changeable according to receiving environments, and the amount of processing operations can be reduced in a superior receiving environment. Accordingly, the load imposed on the integration means can be reduced, thus enabling realization of reduced power consumption.

According to the first aspect of the present invention, a CDMA receiver comprises: despreading means which produces a first despread pilot signal by despreading at a first timing a pilot signal included in a received signal, produces a second despread pilot signal by despreading the pilot signal at a second timing earlier than the first timing by a given period of time, and produces a third despread pilot signal by despreading the pilot signal at third timing later than the first timing by a given period of time; first strength determination means which produces a first received pilot signal strength from the first despread pilot signal; second strength determination means which produces a second received pilot signal strength from the second despread pilot signal and a third received pilot signal strength from the third despread pilot signal; strength difference detection means for detecting a difference between the second received pilot signal strength and the third received pilot signal strength; integration means which adds together the strength differences and outputs a received strength difference sum; integration control means which determines an integration interval for the integration means from the first received pilot signal strength; an ON/OFF switch for activating or deactivating the integration means according to the integration interval; and phase tracking control means for adjusting the phase of the first timing on the basis of the received strength difference sum. The CDMA receiver changes the integration interval according to the strength of the received pilot signal, thus reducing the amount of integrating operations.

According to the second aspect of the present invention, the CDMA-receiver as mentioned above further comprises: demodulation means which demodulates the received data signal despread by the despreading means and outputs demodulated data; re-modulation means which modulates again the demodulated data and outputs re-modulated signal; error rate calculation means which calculates a receiving error rate from the received data signal and the re-modulated signal; and integration control means which decides the integration interval used by the integration means from the receiving error rate. The CDMA receiver reduces the integrating operations by changing the integration interval according to the receiving error rate calculated from the data signal and the re-modulated signal.

Further, according to the third aspect of the present invention, a CDMA receiver comprises: a receiving antenna for receiving a signal transmitted from a base station; a radio section which produces a base band signal by converting the frequency band of the received signal from a radio frequency range to a base band range; a despreading section which acquires received data addressed to the CDMA receiver by despreading the base band signal; a demodulation section which prepares demodulated data by demodulation of the received data; means for producing a phase tracking control signal from the received data and the demodulated data; and a phase tracking control section which determines the amount of processing operations for calculation of information regarding the phase of a pilot signal with reference to the phase tracking control signal and which controls the amount of processing operations required by the despreading section to perform phase tracking operations. The CDMA receiver reduces the amount of processing operations to be performed by the despreading section by controlling the amount of processing operations for calculation of information regarding the phase of the pilot signal, with reference to the phase tracking control signal calculated from the demodulated signal.

Furthermore, according to the fourth aspect of the present invention, a CDMA base station comprises: despreading means which produces a first despread pilot signal by despreading at a first timing a pilot signal included in a received signal, produces a second despread pilot signal by despreading the pilot signal at a second timing earlier than the first timing by a given period of time, and produces a third despread pilot signal by despreading the pilot signal at third timing later than the first timing by a given period of time; first strength determination means which produces a first received pilot signal strength from the first despread pilot signal; second strength determination means which produces a second received pilot signal strength from the second despread pilot signal and a third received pilot signal strength from the third despread pilot signal; strength difference detection means for detecting a difference between the second received pilot signal strength and the third received pilot signal strength; integration means which adds together the strength differences and outputs a received strength difference sum; integration control means which determines an integration interval for the integration means from the first received pilot signal strength; an ON/OFF switch for activating or deactivating the integration means according to the integration interval; and phase tracking control means for adjusting the phase of the first timing on the basis of the received strength difference sum. The CDMA base station changes the integration interval according to the strength of the received pilot signal, thus reducing the amount of integrating operations.

Moreover, according to the fifth aspect of the present invention, the CDMA base station as mentioned above further comprises: demodulation means which demodulates the received data signal despread by the despreading means and outputs demodulated data; re-modulation means which modulates again the demodulated data and outputs re-modulated signal; error rate calculation means which calculates a receiving error rate from the received data signal and the re-modulated signal; and integration control means which decides the integration interval used by the integration means from the receiving error rate. The CDMA base station reduces the integrating operations by changing the integration interval according to the receiving error rate calculated from the data signal and the re-modulated signal.

Still further, according to the sixth aspect of the present invention, a CDMA base station comprises: a receiving antenna for receiving a signal transmitted from a base station; a radio section which produces a base band signal by converting the frequency band of the received signal from a radio frequency range to a base band range; a despreading section which acquires received data addressed to the CDMA base station by despreading the base band signal; a demodulation section which prepares demodulated data by demodulation of the received data; means for producing a phase tracking control signal from the received data and the demodulated data; and a phase tracking control section which determines the amount of processing operations for calculation of information regarding the phase of a pilot signal with reference to the phase tracking control signal and which controls the amount of processing operations required by the despreading section to perform phase tracking operations. The CDMA base station reduces the amount of processing operations to be performed by the despreading section by controlling the amount of processing operations for calculation of information regarding the phase of the pilot signal, with reference to the phase tracking control signal calculated from the demodulated signal.

Still further, according to the seventh aspect of the present invention, a CDMA communications control method, wherein despreading means produces a first despread pilot signal by despreading at a first timing a pilot signal included in a received signal, produces a second despread pilot signal by despreading the pilot signal at a second timing earlier than the first timing by a given period of time, and produces a third despread pilot signal by despreading the pilot signal at third timing later than the first timing by a given period of time; first strength determination means produces a first received pilot signal strength from the first despread pilot signal; second strength determination means produces a second received pilot signal strength from the second despread pilot signal and a third received pilot signal strength from the third despread pilot signal; strength difference detection means detects a difference between the second received pilot signal strength and the third received pilot signal strength; integration means adds together the strength differences and outputs a received strength difference sum; integration control means determines an integration interval for the integration means from the first received pilot signal strength; an ON/OFF switch activates or deactivates the integration means according to the integration interval; and phase tracking control means adjusts the phase of the first timing on the basis of the received strength difference sum. The CDMA communications control method permits a change in the integration interval according to the strength of the received pilot signal, thus reducing the amount of integrating operations.

Still further, according to the eighth aspect of the present invention, the CDMA communications control method as mentioned above, in that demodulation means demodulating the received data signal despread by the despreading means and outputs demodulated data; re-modulation means modulating again the demodulated data and outputs re-modulated signal; error rate calculation means calculating a receiving error rate from the received data signal and the re-modulated signal; and integration control means deciding the integration interval used by the integration means from the receiving error rate. The CDMA communications control method reduces the integrating operations by changing the integration interval according to the receiving error rate calculated from the data signal and the re-modulated signal.

Still further, according to the present invention, a CDMA communications control method comprises: a receiving antenna for receiving a signal transmitted from a base station; a radio section which produces a base band signal by converting the frequency band of the received signal from a radio frequency range to a base band range; a despreading section which acquires received data addressed to the CDMA base station by despreading the base band signal; a demodulation section which prepares demodulated data by demodulation of the received data; means for producing a phase tracking. control signal from the received data and the demodulated data; and a phase tracking control section which determines the amount of processing operations for calculation of information regarding the phase of a pilot signal with reference to the phase tracking control signal and which controls the amount of processing operations required by the despreading section to perform phase tracking operations. The CDMA communications control method permits a reduction in the amount of processing operations to be performed by the despreading section by controlling the amount of processing operations for calculation of information regarding the phase of the pilot signal, with reference to the phase tracking control signal calculated from the demodulated signal.

DETAILED DESCRIPTION OF THE PREFERRED EMBODIMENTS

Embodiments of the present invention will be described in detail by reference to FIGS. 1, 2, and 3.

First Embodiment

A first embodiment of the present invention is directed to a CDMA receiver phase tracking system, wherein integration means is activated or deactivated by means of an ON/OFF switch according to the integration interval determined by measurement of the strength of the pilot signal.

Figure 1:
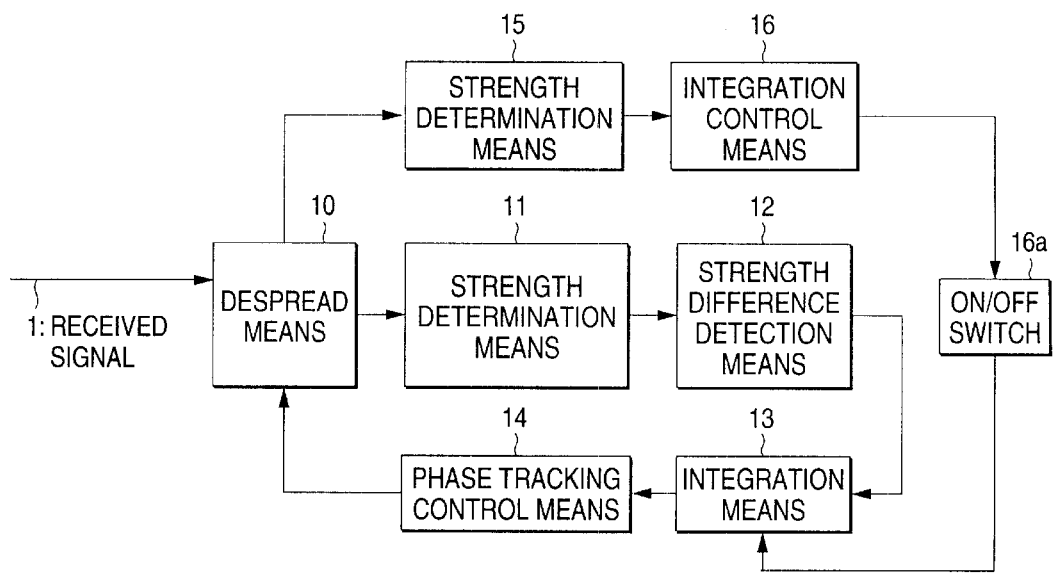
FIG. 1 is a block diagram showing the configuration of a CDMA receiver phase tracking system according to a first embodiment of the present invention.

FIG. 1 shows the configuration of the CDMA receiver phase tracking system according to the first embodiment. In the CDMA receiver phase tracking system shown in FIG. 1, a received signal 1 is a signal which is transmitted from a radio communications base station and is received by a mobile device. Despread means 10 despreads a pilot signal included in the received signal 1, despreads the pilot signal included in the received signal 1 at a despread timing which is made earlier by a given period of time, and despreads the pilot signal included in the received signal 1 at a despread timing which is made later by a given period of time.

Strength determination means 11 determines the strength of the received pilot signal whose despread timing is made earlier (or later) by a given period of time, from the pilot signal whose despread timing is made earlier (or later) by a given period of time, both of which are despread by the despread means 10. Strength difference detection means 12 detects a difference in strength between the strength of the received pilot signal having despread timings made earlier by a given period of time which is determined by the strength determination means 11 and the strength of the received pilot signal having despread timing made later by a given period of time which is determined by the strength determination means 11. Integration means 13 adds together the differences in strength detected by the strength difference detection means 12. Strength determination means 15 determines the strength of the received pilot signal from the pilot signal despread by the despread means 10. Integration control means 16 decides an integration interval used by the integration means 13, from the strength of the received pilot signal determined by the strength determination means 15. An ON/OFF switch 16a activates or deactivates the integration means 13 according to the integration interval for the integration means 13 determined by the integration control means 16. Phase tracking control means 14 adjusts a despread phase on the basis of a received strength difference sum calculated by the integration means 13.

With reference to FIG. 1, the operation of the CDMA receiver phase tracking system according to the first embodiment will now be described. The strength determination means 15 determines the strength of the received pilot signal. The receiving strength is taken as the receiving environment for radio communication. The integration control means 16 decides an integral interval suitable for the receiving environment. On the basis of the information regarding the integration interval, the ON/OFF switch 16a transmits to the integration means 13 the information regarding the activation or deactivation of the integration means 13. The integration means 13 performs integrating operations only during the period of time and remains inactive during the other period of time. The phase tracking control means 14 generates a phase tracking control instruction through use of the integration results produced by the integration means 13. By means of the thus-produced control instruction, the despread means 10 changes the despread phase, thus despreading the pilot signal at a more desirable timing.

As mentioned previously, according to the first embodiment of the present invention, the CDMA receiver phase tracking system is provided with the strength determination means, the integration control means, and the ON/OFF switch and is arranged so as to increase or decrease the integration interval according to the receiving environment. Accordingly, when there is the superior receiving environment, the amount of integrating operations is reduced, thus realizing a reduction in the power dissipated by the CDMA receiver.

Second Embodiment

A second embodiment of the present invention is directed to a CDMA receiver phase tracking system comprising demodulation means, re-modulation means, and error rate calculation means. The CDMA receiver phase tracking system increases or decreases an integral interval according to a receiving error rate. When there is a superior receiving environment, the amount of integrating operations is reduced.

Figure 2:
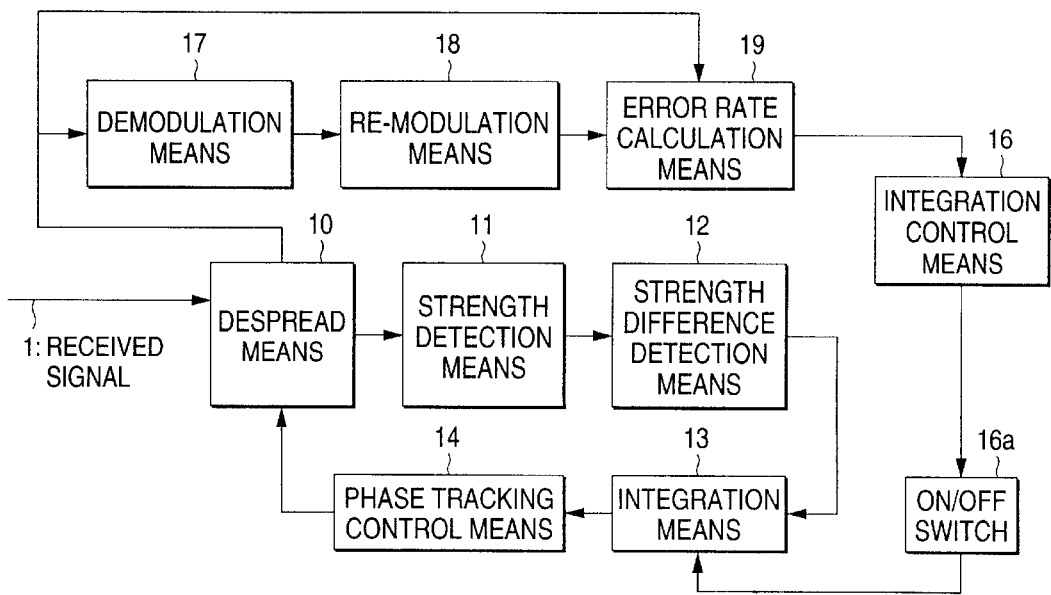
FIG. 2 is a block diagram showing the configuration of a CDMA receiver phase tracking system according to a second embodiment of the present invention.

FIG. 2 shows the configuration of the CDMA receiver phase tracking system according to the second embodiment of the present invention. The CDMA receiver phase tracking system according to the second embodiment has demodulation means 17, re-modulation means 18, and error rate calculation means 19 in place of the strength determination means 15 of the CDMA receiver phase tracking system shown in FIG. 1. In FIG. 2, the demodulation means 17 demodulates a received data signal. The re-modulation means 18 modulates again the received data signal demodulated by the demodulation means 17. The error rate calculation means 19 calculates a receiving error rate from the received data signal despread by the despread means 10 and from the re-demodulated signal modulated by the re-modulation means 18. The integration control means 16 decides an integration interval used by the integration means 13, from the receiving error rate calculated by the error rate calculation means 19.

The operation of the CDMA receiver phase tracking system according to the second embodiment will now be described by reference to FIG. 2. The despread means 10 receives the signal 1 received by the CDMA receiver and despreads a received data signal included in the received signal. The demodulation means 17 demodulates the received data signal. The re-modulation means 18 modulates again the demodulated received data signal. The error rate calculation means 19 calculates a receiving error rate from the received data signal despread by the despread means 10 and from the re-modulated received data signal re-modulated by the re-modulation means 18. The receiving error rate is taken as the receiving environment for radio communication.

The integration control means 16 decides an integration interval suitable for the receiving environment. On the basis of the information regarding an integration interval, the ON/OFF switch 16a transfers to the integration means 13 the information regarding the activation or deactivation of the integration means 13. The integration means 13 performs integrating operations only during the period of this time and remains inactive during the other period of time. The phase tracking control means 14 generates a phase tracking control instruction through use of the integration results produced by the integration means 13. By means of the thus-produced control instruction, the despread means 10 changes the despread phase, thus despreading the pilot signal at a more desirable timing.

As mentioned previously, according to the second embodiment of the present invention, the CDMA receiver phase tracking system is provided with the demodulation means, the re-modulation means, and the error rate calculation means and is arranged so as to increase or decrease the integration interval according to the receiving environment. Accordingly, when there is the superior receiving environment, the amount of integrating operations is reduced, thus realizing a reduction in the power dissipated by the CDMA receiver.

Third Embodiment

A third embodiment of the present invention is directed to a CDMA receiver which produces a phase tracking control signal from the signal that is demodulated by despreading a received signal and which determines the amount of processing operations for calculation of phase information while taking the demodulated signal as a reference. The CDMA receiver produces the information regarding the phase of the pilot signal according to the amount of processing operations for calculation.

Figure 3:
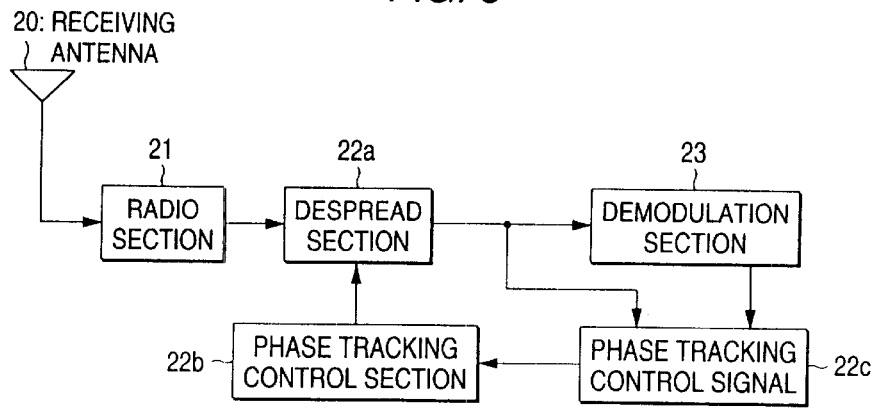
FIG. 3 is a block diagram showing the configuration of a CDMA receiver according to a third embodiment of the present invention.
Figure 4:
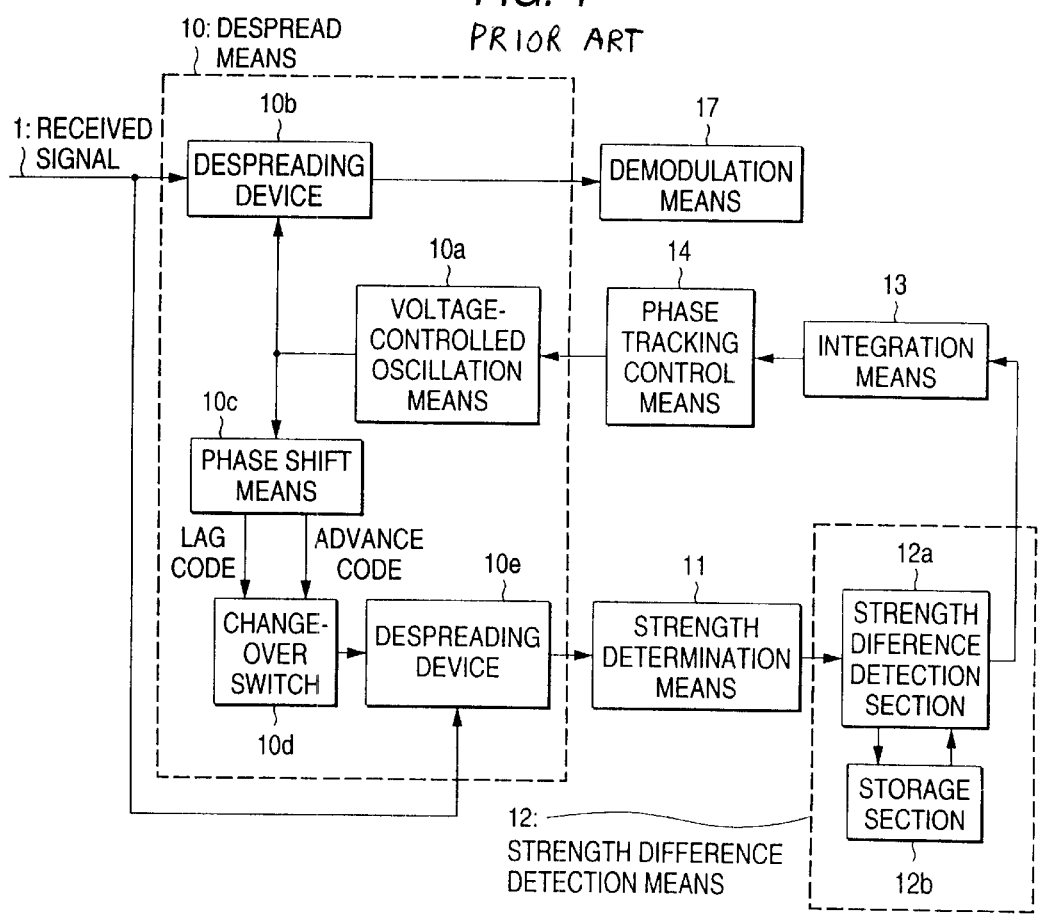
FIG. 4 is a block diagram showing the configuration of an existing CDMA receiver phase tracking system.

FIG. 3 is a block diagram showing the configuration of a CDMA receiver according to a third embodiment of the present invention. In the CDMA receiver shown in FIG. 3, a receiving antenna 20 receives a signal transmitted from a base station. A radio section 21 converts the frequency of the signal received by the receiving antenna 20 into a base band range from a radio frequency range. A despreading section 22a performs a despreading operation for acquiring the received data addressed to the CDMA receiver, from the received signal whose frequency is converted by the radio section 21. A phase tracking control section 22b decides the amount of processing operation required by the despread section 22a to calculate the information of the phase of the pilot signal for phase tracking purposes. A phase tracking control signal 22c is used as the standard by which the phase tracking control section 22b determines the amount of processing operations required by the despread section 22a to calculate the information of the phase of the pilot signal for phase tracking purposes. A demodulation section 23 demodulates the received data despread by the despread section 22a.

The operation of the CDMA receiver according to the third embodiment will now be described by reference to FIG. 3. The phase tracking control section 22b decides the amount of processing operations required by the despread section 22a to calculate the information regarding the phase of the pilot signal for phase tracking purposes. As a result, the amount of processing operations required by the despread section 22a to perform phase tracking operations can be controlled. The phase of the pilot signal sent from the base station can be tracked by means of an amount of processing operations suitable for the receiving environment for radio communication. The amount of processing operations performed by the despread section 22a is reduced, and the amount of processing operations performed by the entire receiver is also reduced, thus realizing a reduction in power consumption. Further, the wait and call time of the receiver can be extended to a much greater extent.

As mentioned above, according to the third embodiment of the present invention, the CDMA receiver has the despread section, the demodulation section, and the phase tracking control section. The CDMA receiver produces a phase tracking control signal from the signal that is demodulated by despreading the receiving signal and determines the amount of processing operations for calculation of the information regarding the phase of the pilot signal, with reference to the phase tracking control signal. The information regarding the phase of the pilot signal is calculated according to the previously-described amount of processing operations. Accordingly, the power dissipated by the CDMA receiver can be reduced, and the wait and call time of the CDMA receiver can be extended.

Although the present invention has been described in the previous embodiments while taking the CMDA receiver of a mobile device as an example, the present invention can also be applied to a CDMA receiving circuit of the base station, thus yielding an advantageous result analogous to the advantageous results yielded by the foregoing embodiments.

As has been described above, according to the present invention, a CDMA receiver phase tracking system is configured so as to perform a phase tracking control operations on the basis of a received strength difference sum which is integrated over an integration interval corresponding to the strength of a received pilot signal. As a result, when there is the superior receiving environment, the amount of integrating operations is reduced, thus resulting in a reduction in the power dissipated by the CDMA receiver.

What is claimed is:

1. A CDMA receiver comprising:
   despreading means which produces a first despread pilot signal by despreading at a first timing a pilot signal included in a received signal, produces a second despread pilot signal by despreading the pilot signal at a second timing earlier than the first timing by a given period of time, and produces a third despread pilot signal by despreading the pilot signal at third timing later than the first timing by a given period of time;
   first strength determination means which produces a first received pilot signal strength from the first despread pilot signal;
   second strength determination means which produces a second received pilot signal strength from the second despread pilot signal and a third received pilot signal strength from the third despread pilot signal;
   strength difference detection means for detecting a difference between the second received pilot signal strength and the third received pilot signal strength;
   integration means which accumulates the strength difference and outputs a received strength difference sum;
   integration control means which determines an integration interval from the first received pilot signal strength;
   an ON/OFF switch for activating or deactivating the integration means according to the integration interval; and
   phase tracking control means for adjusting the phase of the first timing on the basis of the received strength difference sum.

2. The CDMA receiver according to claim 1, further comprising:
   demodulation means which demodulates the received data signal despread by the despreading means and outputs demodulated data;
   re-modulation means which modulates again the demodulated data and outputs re-modulated signal;
   error rate calculation means which calculates a receiving error rate from the received data signal and the re-modulated signal; and
   integration control means which decides the integration interval used by the integration means based on the receiving error rate.

3. A CDMA receiver comprising:
   a receiving antenna for receiving a signal transmitted from a base station;
   a radio section which produces a base band signal by converting the frequency band of the received signal from a radio frequency range to a base band range;
   a despreading section which acquires received data addressed to the CDMA receiver by despreading the base band signal;
   a demodulation section which produces demodulated data by demodulating the received data;
   means for producing a phase tracking control signal from the received data and the demodulated data; and
   a phase tracking control section which determines an amount of processing operations for calculation of information regarding the phase of a pilot signal, wherein said amount is based on the phase tracking control signal, and wherein said amount controls an amount of processing operations required by the despreading section to perform phase tracking operations.

4. A CDMA base station comprising:
   despreading means which produces a first despread pilot signal by despreading at a first timing a pilot signal included in a received signal, produces a second despread pilot signal by despreading the pilot signal at a second timing earlier than the first timing by a given period of time, and produces a third despread pilot signal by despreading the pilot signal at third timing later than the first timing by a given period of time;
   first strength determination means which produces a first received pilot signal strength from the first despread pilot signal;
   second strength determination means which produces a second received pilot signal strength from the second despread pilot signal and a third received pilot signal strength from the third despread pilot signal;
   strength difference detection means for detecting a difference between the second received pilot signal strength and the third received pilot signal strength;
   integration means which accumulates the strength difference and outputs a received strength difference sum;
   integration control means which determines an integration interval from the first received pilot signal strength;
   an ON/OFF switch for activating or deactivating the integration means according to the integration interval; and
   phase tracking control means for adjusting the phase of the first timing on the basis of the received strength difference sum.

5. The CDMA base station according to claim 4, further comprising:
   demodulation means which demodulates the received data signal despread by the despreading means and outputs demodulated data;
   re-modulation means which modulates again the demodulated data and outputs re-modulated signal;
   error rate calculation means which calculates a receiving error rate from the received data signal and the re-modulated signal; and
   integration control means which decides the integration interval used by the integration means based on the receiving error rate.

6. A CDMA base station comprising:

a receiving antenna for receiving a signal transmitted from a base station;

a radio section which produces a base band signal by converting the frequency band of the received signal from a radio frequency range to a base band range;

a despreading section which acquires received data addressed to the CDMA base station by despreading the base band signal;

a demodulation section which prepares demodulated data by demodulation of the received data;

means for producing a phase tracking control signal from the received data and the demodulated data; and a phase tracking control section which determines an amount of processing operations for calculation of information regarding the phase of a pilot signal, wherein said amount is based on the phase tracking control signal, and wherein said amount controls an amount of processing operations required by the despreading section to perform phase tracking operations.

7. A CDMA communications control method comprising the steps of:

producing a first despread pilot signal by despreading at a first timing a pilot signal included in a received signal;

producing a second despread pilot signal by despreading the pilot signal at a second timing earlier than the first timing by a given period of time;

producing a third despread pilot signal by despreading the pilot signal at third timing later than the first timing by a given period of time;

producing a first received pilot signal strength from the first despread pilot signal;

producing a second received pilot signal strength from the second despread pilot signal and a third received pilot signal strength from the third despread pilot signal;

detecting a difference between the second received pilot signal strength and the third received pilot signal strength;

outputting a received strength difference sum value by accumulating the strength difference;

determining an integration interval from the first received pilot signal strength;

activating/deactivating the step of outputting according to the integration interval; and adjusting the phase of the first timing on the basis of the received strength difference sum value.

8. The CDMA communications control method according to claim 7, further comprising the steps of:

producing a received data signal by despreading the received signal;

demodulating the received data signal and outputting demodulated data;

modulating again the demodulated data and outputting a re-modulated signal;

calculating a receiving error rate from the received data signal and the re-modulated signal; and deciding the integration interval used in the step of outputting based on the receiving error rate.

9. A CDMA communications control method comprising the steps of:

receiving a signal transmitted from a base station;

producing a base band signal by converting the frequency band of the received signal from a radio frequency range to a base band range;

acquiring received data addressed to the CDMA base station by despreading the base band signal;

producing demodulated data by demodulation of the received data;

producing a phase tracking control signal from the received data and the demodulated data; and determining an amount of processing operations for calculation of information regarding the phase of a pilot signal, wherein said amount is based on the phase tracking control signal, and wherein said amount controls an amount of processing operations required by a despreading section to perform phase tracking operations.

* * * * *